(12) United States Patent
Eguchi

(10) Patent No.: US 6,853,496 B2
(45) Date of Patent: Feb. 8, 2005

(54) ZOOM LENS SYSTEM

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 6 days.

(21) Appl. No.: 10/630,732

(22) Filed: Jul. 31, 2003

(65) Prior Publication Data

US 2004/0032670 A1 Feb. 19, 2004

(30) Foreign Application Priority Data

Aug. 13, 2002 (JP) .................................... 2002-235469

(51) Int. Cl.[7] .............................................. G02B 15/14
(52) U.S. Cl. ...................... 359/687; 359/684; 359/685
(58) Field of Search ................................ 359/687, 676, 359/683, 684, 685

(56) References Cited

U.S. PATENT DOCUMENTS

| | | | | |
|---|---|---|---|---|
| 5,100,223 A | | 3/1992 | Ono et al. .................. | 359/683 |
| 5,363,242 A | | 11/1994 | Yokota ....................... | 359/684 |
| 5,570,233 A | | 10/1996 | Mihara et al. .............. | 359/687 |
| 5,973,854 A | * | 10/1999 | Shimo ........................ | 359/676 |
| 6,128,140 A | | 10/2000 | Yoneyama .................. | 359/687 |
| 6,353,505 B1 | | 3/2002 | Yoneyama .................. | 359/687 |
| 6,456,441 B2 | | 9/2002 | Hoshi ......................... | 359/687 |
| 6,462,886 B1 | * | 10/2002 | Hagimori .................... | 359/687 |
| 6,487,023 B2 | | 11/2002 | Yoneyama .................. | 359/687 |
| 6,577,450 B2 | * | 6/2003 | Hamano et al. ............ | 359/687 |
| 6,580,565 B2 | | 6/2003 | Ozaki ......................... | 359/687 |

FOREIGN PATENT DOCUMENTS

| | | |
|---|---|---|
| JP | 3-33710 | 2/1991 |
| JP | 5-27167 | 2/1993 |
| JP | 7-20381 | 1/1995 |

* cited by examiner

*Primary Examiner*—Jordan M. Schwartz
(74) *Attorney, Agent, or Firm*—Greenblum & Bernstein, P.L.C.

(57) ABSTRACT

A zoom lens system includes a movable-positive first lens group, a movable-negative second lens group, a movable-positive third lens group, and a movable-positive fourth lens group. Upon zooming from the short to the long focal length extremities, all the lens groups are arranged to move in a manner that the distance between the first lens group and the second lens group increases, the distance between the second lens group and the third lens group decreases, the distance between the third lens group and the fourth lens group increases, and the distance between the first lens group and the third lens group does not change. Upon zooming from the short to the long focal length extremities, the fourth lens group first moves toward the image and thereafter moves toward the object in a U-turn path.

6 Claims, 16 Drawing Sheets

Fig. 1
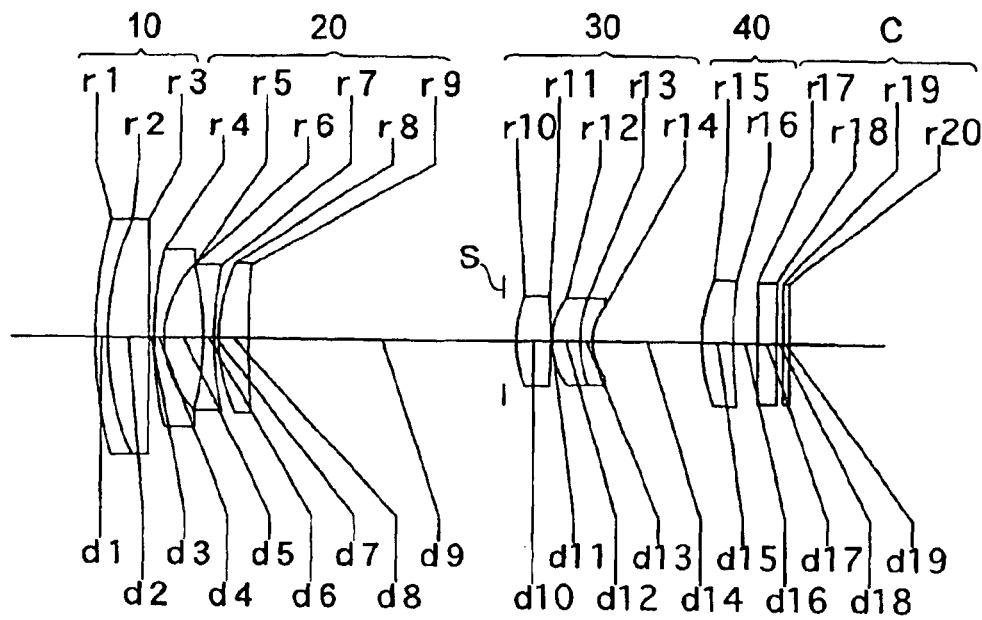
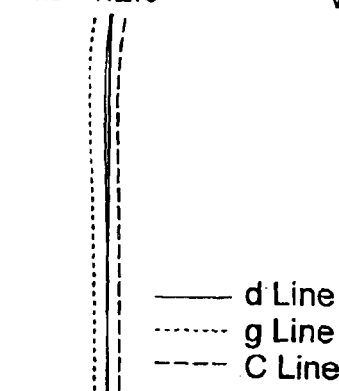
Fig. 2A
$F_{NO}=1:2.8$
—— d Line
······ g Line
---- C Line
-0.1   0.1
SPHERICAL
ABERRATION
CHROMATIC
ABERRATION
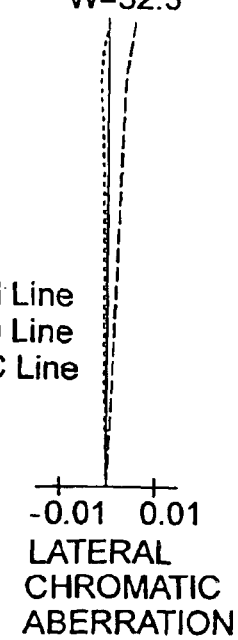
Fig. 2B
W=32.3°
-0.01   0.01
LATERAL
CHROMATIC
ABERRATION
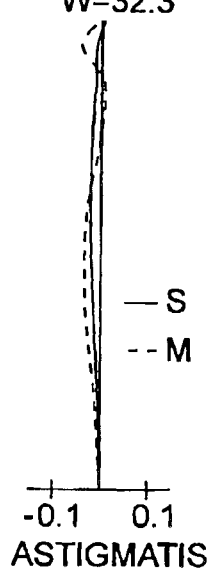
Fig. 2C
W=32.3°
—— S
---- M
-0.1   0.1
ASTIGMATISM
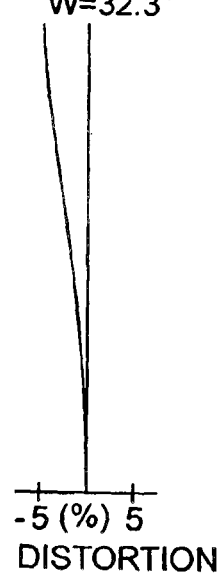
Fig. 2D
W=32.3°
-5 (%)   5
DISTORTION

F_NO.=1:3.2

——— d Line
········ g Line
- - - C Line

-0.1   0.1
SPHERICAL
ABERRATION

CHROMATIC
ABERRATION

W=21.4°

-0.01   0.01
LATERAL
CHROMATIC
ABERRATION

W=21.4°

——— S
- - M

-0.1   0.1
ASTIGMATISM

W=21.4°

-5 (%) 5
DISTORTION

F_NO.=1:3.6

——— d Line
········ g Line
- - - C Line

-0.1   0.1
SPHERICAL
ABERRATION

CHROMATIC
ABERRATION

W=14.1°

-0.01   0.01
LATERAL
CHROMATIC
ABERRATION

W=14.1°

——— S
- - M

-0.1   0.1
ASTIGMATISM

W=14.1°

-5 (%) 5
DISTORTION

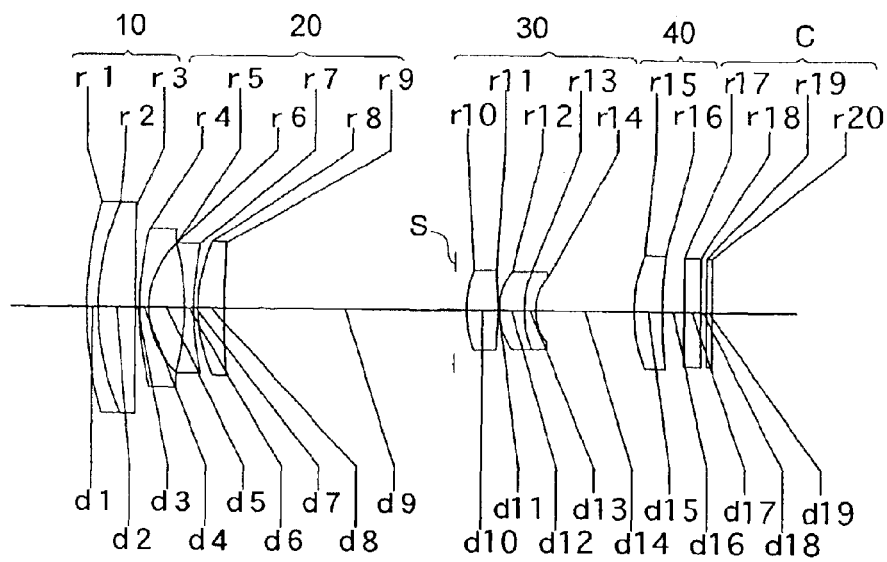
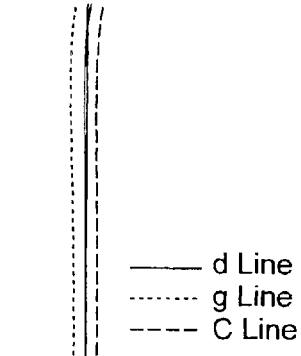
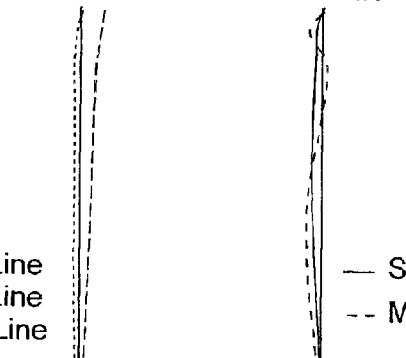
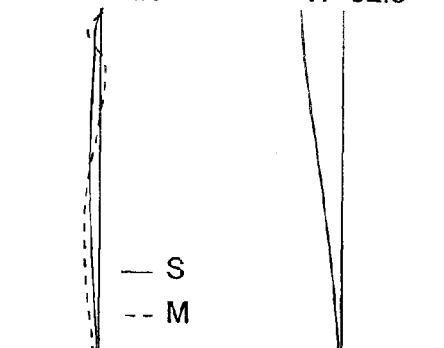

F_NO=1:3.3
——— d Line
········· g Line
---- C Line
-0.1  0.1
SPHERICAL
ABERRATION

CHROMATIC
ABERRATION

W=21.4°
-0.01  0.01
LATERAL
CHROMATIC
ABERRATION

W=21.4°
— S
-- M
-0.1  0.1
ASTIGMATISM

W=21.4°
-5 (%) 5
DISTORTION

F_NO=1:3.6
——— d Line
········· g Line
---- C Line
-0.1  0.1
SPHERICAL
ABERRATION

CHROMATIC
ABERRATION

W=14.1°
-0.01  0.01
LATERAL
CHROMATIC
ABERRATION

W=14.1°
— S
-- M
-0.1  0.1
ASTIGMATISM

W=14.1°
-5 (%) 5
DISTORTION

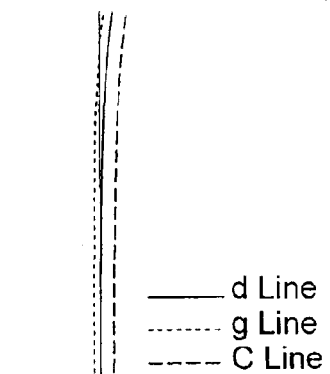
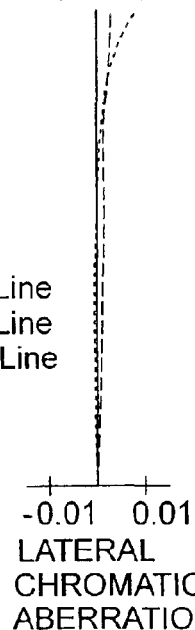
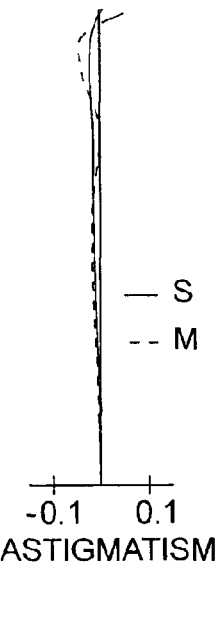
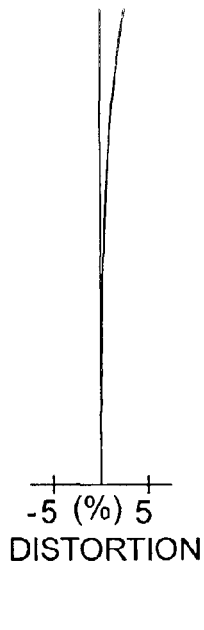
Fig. 13A  F$_{NO.}$=1:3.2
Fig. 13B  W=21.4°
Fig. 13C  W=21.4°
Fig. 13D  W=21.4°
-0.1  0.1
SPHERICAL ABERRATION
CHROMATIC ABERRATION
-0.01  0.01
LATERAL CHROMATIC ABERRATION
-0.1  0.1
ASTIGMATISM
-5 (%) 5
DISTORTION
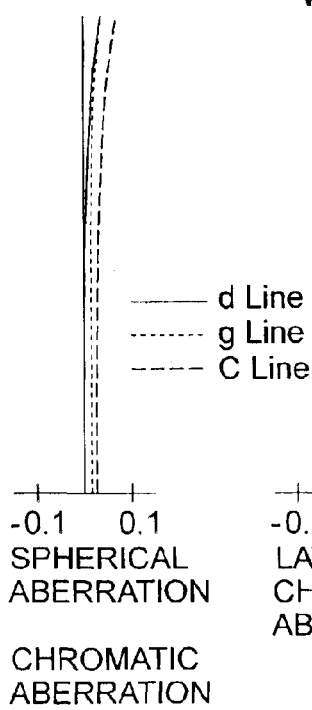
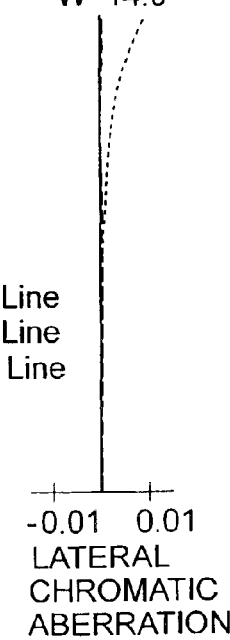
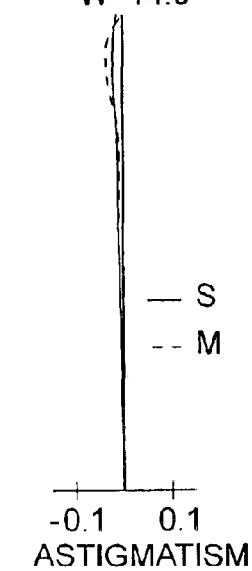
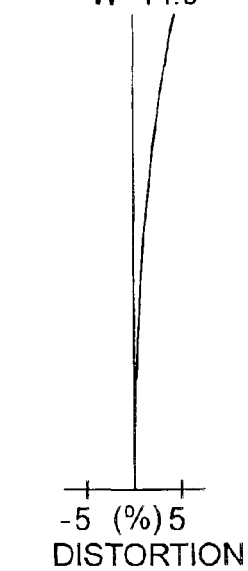
Fig. 14A  F$_{NO.}$=1:3.6
Fig. 14B  W=14.0°
Fig. 14C  W=14.0°
Fig. 14D  W=14.0°
-0.1  0.1
SPHERICAL ABERRATION
CHROMATIC ABERRATION
-0.01  0.01
LATERAL CHROMATIC ABERRATION
-0.1  0.1
ASTIGMATISM
-5 (%) 5
DISTORTION

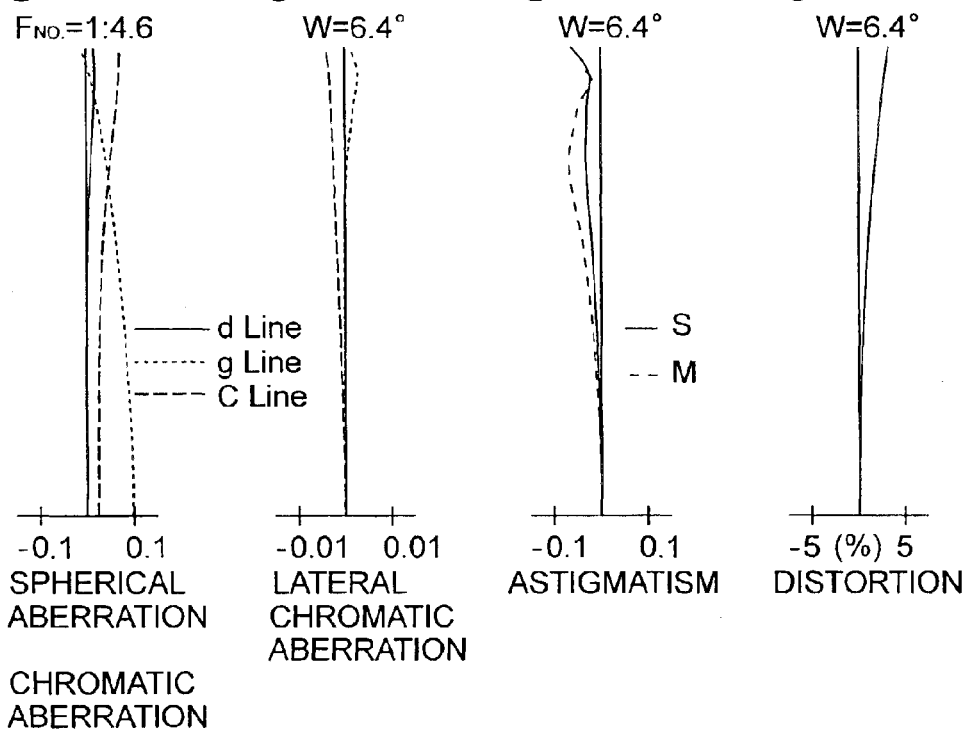

Fig. 16
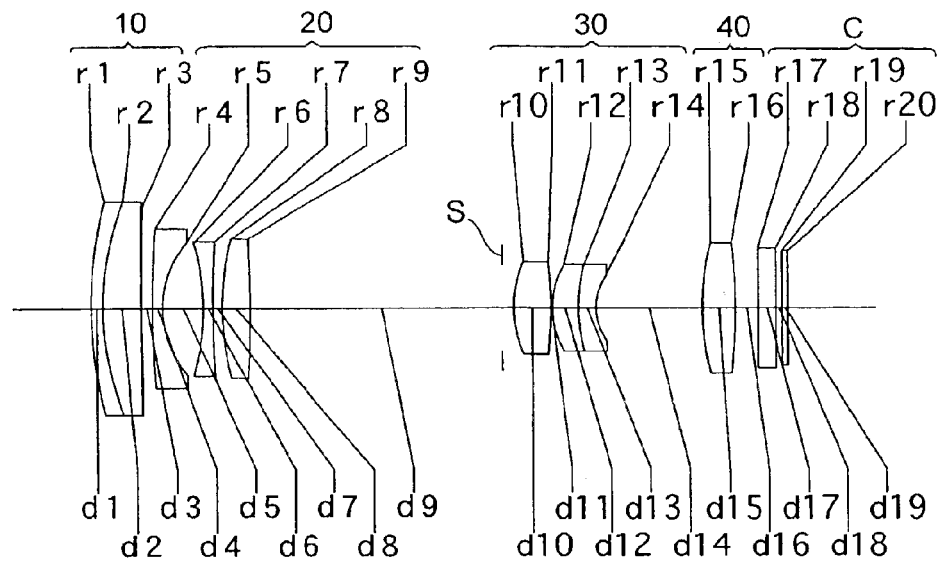
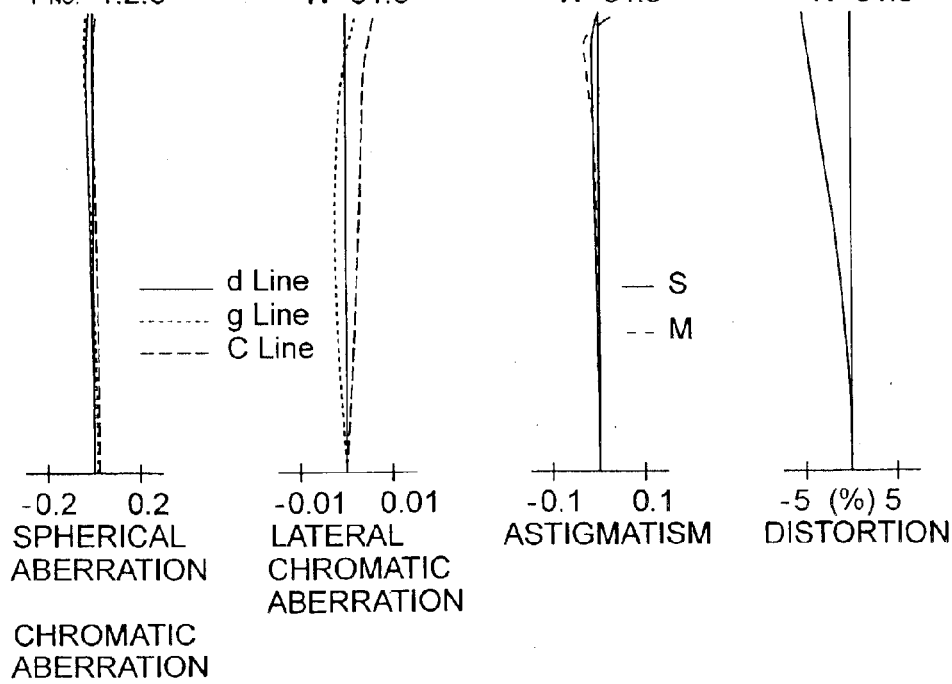
Fig. 17A  Fig. 17B  Fig. 17C  Fig. 17D

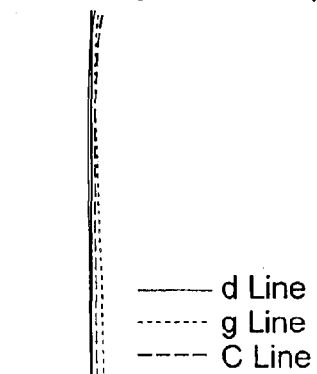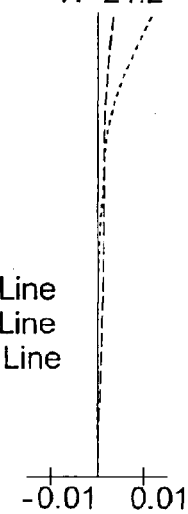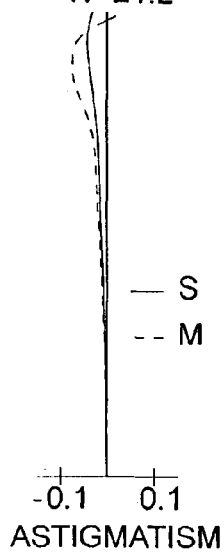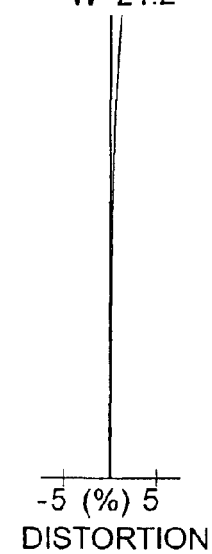
Fig. 18A  Fig. 18B  Fig. 18C  Fig. 18D
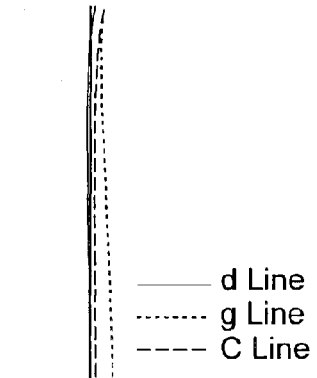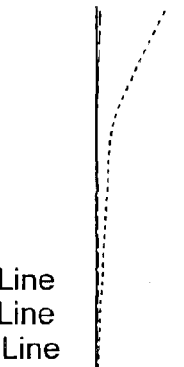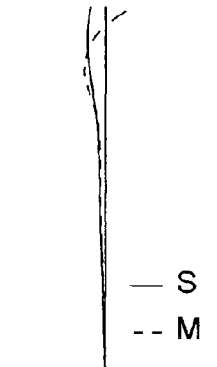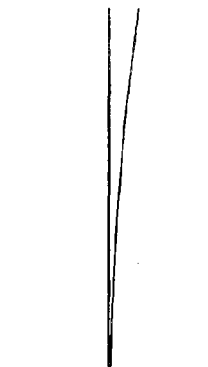
Fig. 19A  Fig. 19B  Fig. 19C  Fig. 19D

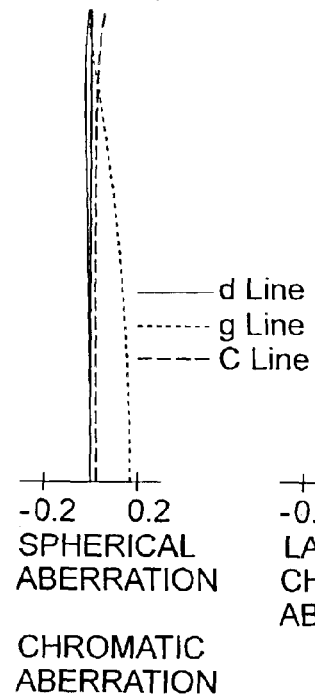
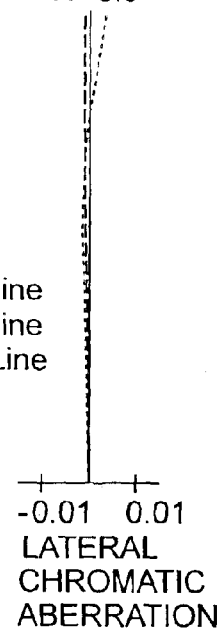
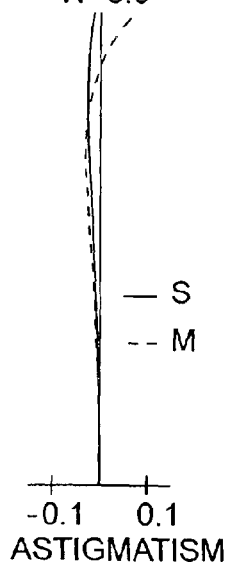
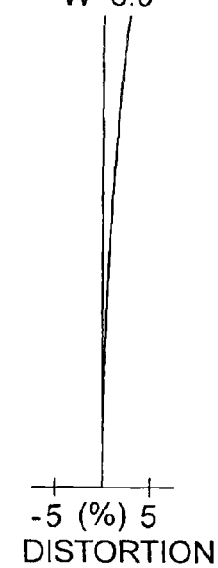

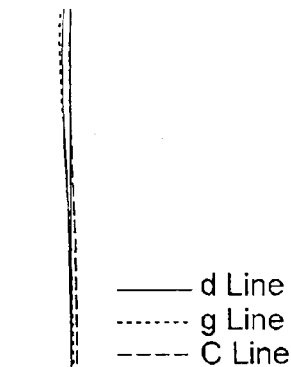
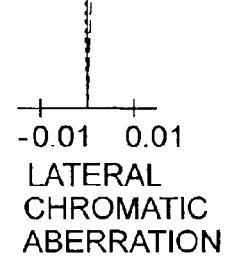
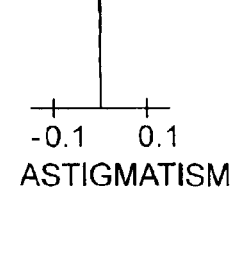
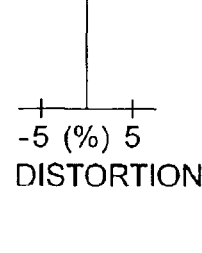
Fig. 23A
F_{NO.}=1:3.2
Fig. 23B
W=20.9°
Fig. 23C
W=20.9°
Fig. 23D
W=20.9°
——— d Line
······· g Line
- - - C Line
— S
- - M
-0.2  0.2
SPHERICAL
ABERRATION
CHROMATIC
ABERRATION
-0.01  0.01
LATERAL
CHROMATIC
ABERRATION
-0.1  0.1
ASTIGMATISM
-5 (%) 5
DISTORTION
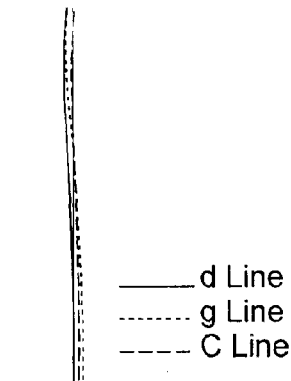
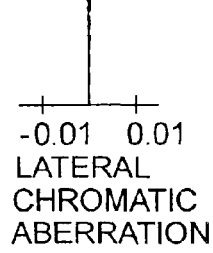
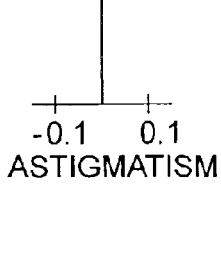
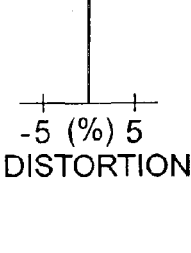
Fig. 24A
F_{NO.}=1:3.6
Fig. 24B
W=14.1°
Fig. 24C
W=14.1°
Fig. 24D
W=14.1°
——— d Line
······· g Line
- - - C Line
— S
- - M
-0.2  0.2
SPHERICAL
ABERRATION
CHROMATIC
ABERRATION
-0.01  0.01
LATERAL
CHROMATIC
ABERRATION
-0.1  0.1
ASTIGMATISM
-5 (%) 5
DISTORTION

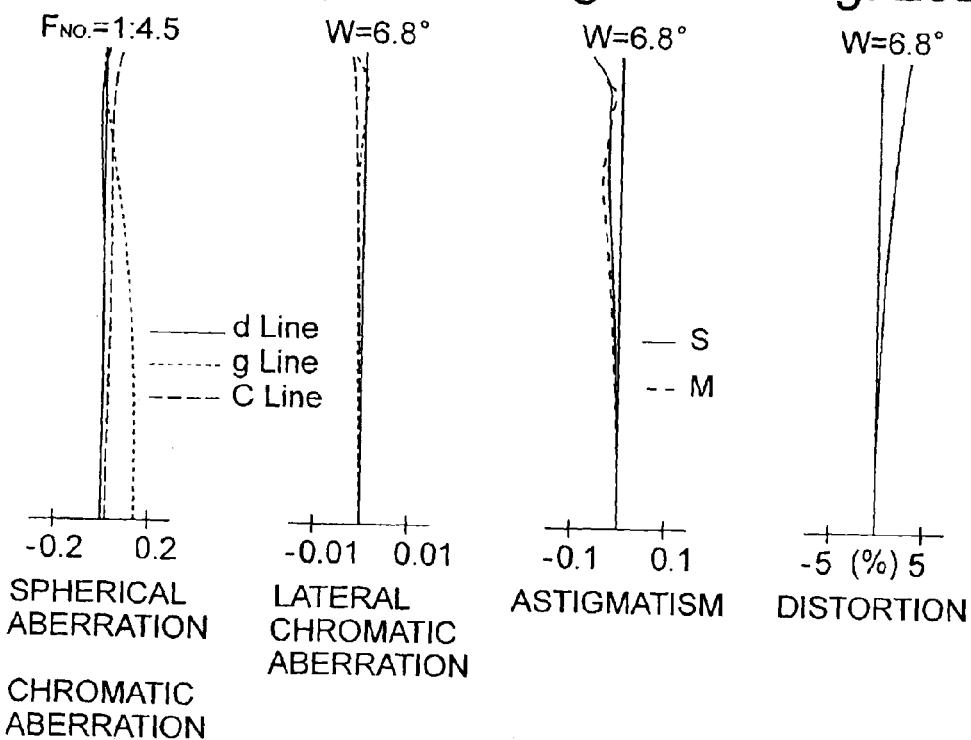

ZOOM LENS SYSTEM

BACKGROUND OF THE INVENTION

1. Field of the Invention

The present invention relates to a zoom lens system, which is to be used mainly in an electronic still camera (digital camera), having a zoom ratio (magnification ratio) exceeding 4 and including a wide angle range.

2. Description of the Prior Art

In recent years, in order to meet the increased need for further miniaturization and higher precision/density of cameras, and higher density of the pixels in CCD image devices are being achieved. Accordingly, a photographing lens system for a digital camera is required to have high resolution. Furthermore, a long back focal distance is also required in order to accommodate a filter group. In an optical system for a color CCD, in order to prevent shading and color shift, good telecentricity, in which the light exits from the final lens surface of the photographing lens system is made incident on the imaging surface at an angle as close to a right angle (90°) as possible, is required.

As a miniaturized zoom lens system for a compact digital camera, it is possible to apply a negative-lead type lens system for a zoom ratio of up to 3 or 4. In a negative-lead type lens system, an increased wide-angle (i.e., a shorter focal length) at the short focal length extremity and further miniaturization of the lens system (especially with respect to reduction of the front lens diameter) can be achieved. Accordingly, such a lens system is suitable for a retractable zoom lens system in which the distance between the lens groups is shortened so that the zoom lens barrels can retract inwards (towards the camera body). However, in such a zoom lens system (negative-lead type lens system), it is difficult to achieve a zoom ratio of 4 or more.

United States Patent (hereinafter, USP) U.S. Pat. No. 5,100,223 and U.S. Pat. No. 5,570,233 are examples of zoom lens systems having a zoom ratio of 4 or more. A zoom ratio of about 6 is achieved in U.S. Pat. No. 5,100,223 and a zoom ratio of about 10 is achieved in U.S. Pat. No. 5,570,233; however, in both publications, the diameter of the front lens group is large, and miniaturization of the camera is not sufficiently attained.

Furthermore, in U.S. Pat. No. 5,100,223, the half angle-of-view at the short focal length extremity is about 25°, which means that a wide angle-of-view, i.e., the shorter focal length at the short focal length extremity, is not sufficiently achieved. U.S. Pat. No. 5,570,233 achieved a wide angle of view; however, the front lens diameter is large, and employs a large number of lens elements, which is not suitable for a retractable zoom lens system for a camera.

In order to further miniaturize a camera with a retractable zoom lens system employing a multi retractable lens barrels, it is necessary to simplify the mechanical construction for moving the movable lens groups upon zooming. Generally, if the number of lens groups is reduced, the mechanical construction therefor can be simplified; however, it is difficult, on the other hand, to achieve a higher zoom ratio. Furthermore, in order to further miniaturize the camera body, a small front lens diameter and a short overall length of the zoom lens system are also necessary. Consequently, a reduced thickness of each lens group is required.

However, if the number of lens elements is reduced in order to miniaturize the zoom lens system, and if the thickness of the lens group is reduced, the correcting of aberrations becomes increasingly difficult. In other words, adequate distribution of refractive power over each lens group, and a specific lens arrangement for this purpose are required.

SUMMARY OF THE INVENTION

The present invention provides a zoom lens system having (i) a small front lens diameter, (ii) a zoom ratio of 4 or more, (iii) a half angle-of-view of 30° at the short focal length extremity; and which is constituted by a small number of lens elements.

According to an aspect of the present invention, a zoom lens system includes a movable first lens group having a positive refractive power (hereinafter, a positive first lens group), a movable second lens group having a negative refractive power (hereinafter, a negative second lens group), a movable third lens group having a positive refractive power (hereinafter, a positive third lens group), and a movable fourth lens group having a positive refractive power (hereinafter, a positive fourth lens group), in this order from the object.

Upon zooming from the short focal length extremity to the long focal length extremity, all the lens group are arranged to be movable in a manner that the distance between the positive first lens group and the negative second lens group increases, the distance between the negative second lens group and the positive third lens group decreases, the distance between the positive third lens group and the positive fourth lens group increases, and the distance between the positive first lens group and the positive third lens group does not change.

Upon zooming from the short focal length extremity to the long focal length extremity, the positive fourth lens group first moves toward the image and thereafter moves toward the object in a U-turn path.

The zoom lens system satisfies the following condition:

$$0.02 < \Delta X4/fw < 0.2 \qquad (1)$$

wherein fw designates the focal length of the entire the zoom lens system at the short focal length extremity; and $\Delta X4$ designates the traveling distance of the positive fourth lens group when the focal length fw changes to "1.5×fw" under the condition that movement of the positive fourth lens group toward the image, from a position thereof at the short focal length extremity as a reference point, is defined as a positive direction.

Due to the integral movement of the positive first lens group and the positive third lens group, the structure of the lens barrel can be made simpler, and the diameter of the lens group can be made smaller. Furthermore, due to such simplification, precision on decentration can be enhanced, and stabilization on imaging performance at a production process can be attained. Accordingly, miniaturization of a compact camera employing a multi retractable lens barrels can be attained. Moreover, the positive fourth lens group is arranged to move in the U-turn path, and to satisfy condition (1); thereby, peripheral illumination which tends to decrease from the short focal length extremity toward an intermediate focal length can be secured.

The negative second lens group is preferably arranged to move toward the image upon zooming from the short focal length extremity to the long focal length extremity. In addition, focusing is preferably performed by the positive fourth lens group.

The zoom lens system preferably satisfies the following conditions:

$$0.5 < |f2|/f3 < 1 \quad (2)$$

$$2 < m3t/m3w < 4 \quad (3)$$

wherein f2 designates the focal length of the negative second lens group;

f3 designates the focal length of the positive third lens group;

m3t designates the paraxial lateral magnification of the positive third lens group when an object at an infinite distance is in an in-focus state at the long focal length extremity; and m3w designates the paraxial lateral magnification of the third lens group when an object at an infinite distance is in an in-focus state at the short focal length extremity.

The positive first lens group is preferably constituted by a negative lens element and a positive lens element.

The positive fourth lens group can be constituted by a positive lens element.

The positive third lens group is preferably constituted by two positive lens elements and one negative lens element.

The present disclosure relates to subject matter contained in Japanese Patent Application No. 2002-235469 (filed on Aug. 13, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1 at the short focal length extremity;

FIG. 6 is a lens arrangement of a zoom lens system according to a second embodiment of the present invention;

FIGS. 7A, 7B, 7C and 7D show aberrations occurred in the lens arrangement shown in FIG. 6 at the short focal length extremity;

FIGS. 13A, 13B, 13C and 13D show aberrations occurred in the lens arrangement shown in FIG. 11 at a first intermediate focal length (on the side of the short focal length);

FIGS. 14A, 14B, 14C and 14D show aberrations occurred in the lens arrangement shown in FIG. 11 at a second intermediate focal length (on the side of the long focal length);

FIGS. 15A, 15B, 15C and 15D show aberrations occurred in the lens arrangement shown in FIG. 11 at the long focal length extremity;

FIG. 16 is a lens arrangement of a zoom lens system according to a fourth embodiment of the present invention;

FIGS. 17A, 17B, 17C and 17D show aberrations occurred in the lens arrangement shown in FIG. 16 at the short focal length extremity;

FIGS. 18A, 18B, 18C and 18D show aberrations occurred in the lens arrangement shown in FIG. 16 at a first intermediate focal length (on the side of the short focal length);

FIGS. 19A, 19B, 19C and 19D show aberrations occurred in the lens arrangement shown in FIG. 16 at a second intermediate focal length (on the side of the long focal length);

FIGS. 20A, 20B, 20C and 20D show aberrations occurred in the lens arrangement shown in FIG. 16 at the long focal length extremity;

FIGS. 23A, 23B, 23C and 23D show aberrations occurred in the lens arrangement shown in FIG. 21 at a first intermediate focal length (on the side of the short focal length);

FIGS. 24A, 24B, 24C and 24D show aberrations occurred in the lens arrangement shown in FIG. 21 at a second intermediate focal length (on the side of the long focal length);

FIGS. 25A, 25B, 25C and 25D show aberrations occurred in the lens arrangement shown in FIG. 21 at the long focal length extremity.

DESCRIPTION OF THE PREFERRED EMBODIMENTS

Figure 26:
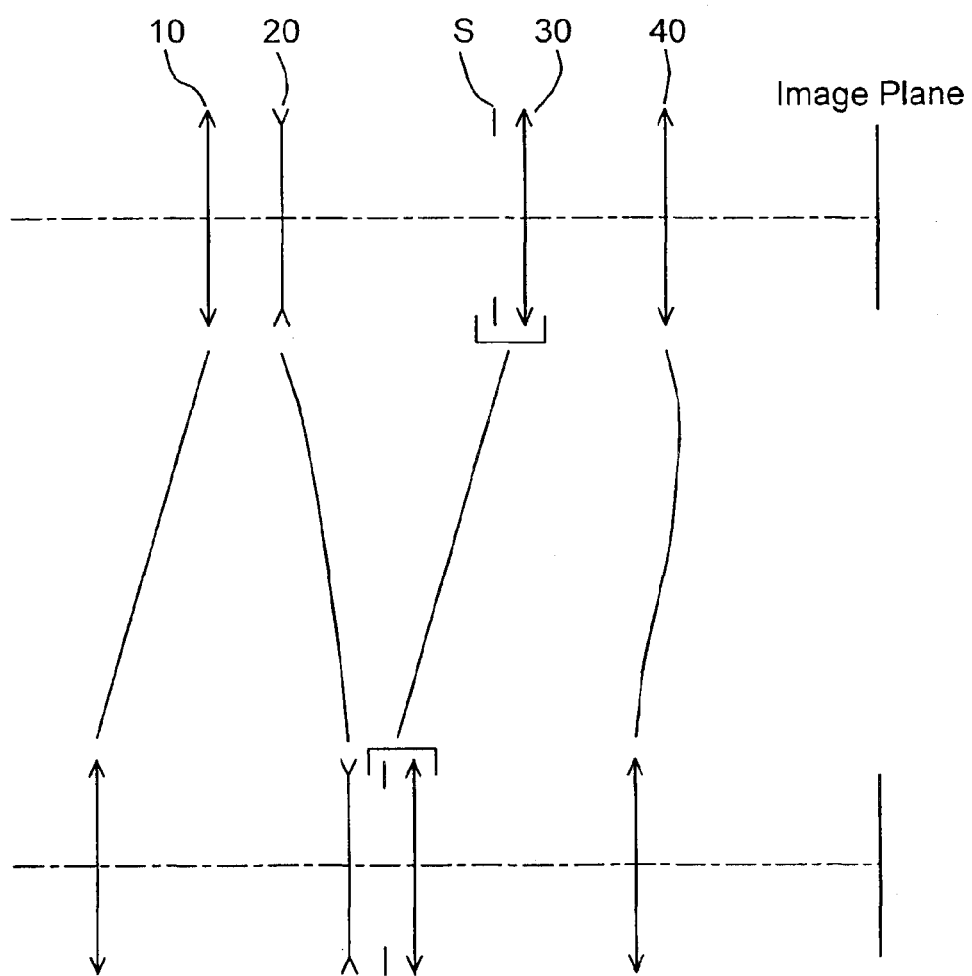
FIG. 26 shows a schematic lens-group moving paths of the zoom lens system according to the present invention.

The zoom lens system of the present invention, as shown in the schematic lens-group moving paths of FIG. 26, includes a positive first lens group 10, a negative second lens group 20, a diaphragm S, a positive third lens group 30, a positive fourth lens group 40, and a filter group C positioned in front of an image pickup device, in this order from the object.

Upon zooming from the short focal length extremity to the long focal length extremity, all the lens groups are arranged to be movable in a manner that the distance between the positive first lens group 10 and the negative second lens group 20 increases, the distance between the negative second lens group 20 and the positive third lens group 30 decreases, the distance between the positive third lens group 30 and the positive fourth lens group 40 increases, and the distance between the positive first lens group 10 and the positive third lens group 30 does not change.

Furthermore, upon zooming, the positive fourth lens group 40 first moves toward the image and thereafter moves toward the object in a "U-turn" path.

The negative second lens group 20 moves toward the image upon zooming. The diaphragm S moves together with the positive third lens group 30. Focusing is performed by the positive fourth lens group 40. The lens-group moving paths shown in 26 is simplified for illustration purposes, and note that the lens-group moving paths of the positive first lens group 10 and the positive third lens group 30 are not necessarily designed as straight-line paths.

Condition (1) specifies the traveling distance of the positive fourth lens group 40 from the short focal length extremity to an intermediate focal length.

In condition (1), the intermediate focal length is defined as 1.5 times of the focal length at the short focal length extremity (i.e., fw×1.5).

In a zoom lens system such as one described above, there is a drawback, i.e., peripheral illumination tends to decrease from the short focal length extremity toward an intermediate focal length. This occurs because (i) the entrance pupil position becomes farther from the first surface of the positive first lens group 10 in a focal length range in the vicinity of the short focal length extremity, and (ii) the height of light rays at the positive first lens group 10 is higher since the angle-of-view is still larger (wider).

In order to prevent a reduction of peripheral illumination, the diameter of the positive first lens group 10 can be increased; however, in a camera employing a retractable zoom lens system, only enlarging the diameter of the positive first lens group 10 inevitably causes an increase of the overall size of the camera.

If ΔX4/fw exceeds the lower limit of condition (1), the entrance pupil position becomes farther from the first surface of the positive fourth lens group 40 in a focal length range in the vicinity of the short focal length extremity (i.e., a focal length range of "1.5×fw; here, fw: the focal length of the entire the zoom lens system at the short focal length extremity). Consequently, the diameter of the positive first lens group 10 is increased.

If ΔX4/fw exceeds the upper limit of condition (1), the back focal distance becomes too short, so that the low-pass filter, etc., cannot be physically accommodated.

The positive fourth lens group 40 is preferably arranged to move toward the image from the short focal length extremity to an intermediate focal length, and to thereafter move toward the object from the intermediate focal length to the long focal length extremity. Such movement of the positive fourth lens group 40 can reduce fluctuation of the entrance pupil position upon zooming. Note that a focal length point where the positive fourth lens group 40 changes the moving direction thereof in the "U-turn" path is at a position which is slightly closer to the long focal length extremity than to the focal length of "1.5×fw".

Condition (2) specifies the refractive power ratio of the negative second lens group 20 to that of the positive third lens group 30, which are arranged to substantially perform zooming.

If |f2|/f3 exceeds the lower limit of condition (2), the negative refractive power of the negative second lens group 20 becomes stronger. Consequently, fluctuations of aberrations upon zooming undesirably increase.

If |f2|/f3 exceeds the upper limit of condition (2), the negative refractive power of the negative second lens group 20 becomes weaker, and the positive refractive power of the positive third lens group 30 also becomes weaker. Consequently, the overall length of the zoom lens system becomes longer.

Condition (3) specifies the ratio of the paraxial lateral magnification of the positive third lens group 30 at the long focal length extremity to the paraxial lateral magnification thereof at the short focal length extremity. Here, note that an object at an infinite distance is in an in-focus state at both the long and short focal length extremities. By satisfying this condition, the diameter of the frontmost lens group (the positive first lens group 10) can be reduced.

If m3t/m3w exceeds the lower limit of condition (3), the zooming burden on the positive third lens group 30 decreases. On the other hand, if an attempt is made to obtain a desired zoom ratio, the zooming burden on the negative second lens group 20 is increased, so that the height of the marginal light rays increase at the long focal length extremity; as a result, the diameter of the positive first lens group 10 becomes larger.

If m3t/m3w exceeds the upper limit of condition (3), the zooming burden on the positive third lens group 30 increases, so that the traveling distance of the positive third lens group 30 upon zooming increases. Consequently, the f-number at the long focal length extremity becomes larger.

In order to reduce the overall length of the zoom lens system at the retracted position, it is necessary to reduce the number of lens elements in each of the positive first through positive fourth lens groups. In particular, in the positive first lens group 10, the lens diameter increases if the number of lens elements thereof increases. Therefore the positive first lens group 10 is preferably constituted by a positive lens element and a negative element, or only by a single positive lens element. Furthermore, in order to achieve a rapid AF function, it is desirable for the focusing lens group (the positive fourth lens group 40) to be constituted by a single positive lens element for the purpose of the weight reduction of the focusing lens group.

In addition to the above, the positive third lens group 30 is preferably constituted by two positive lens elements and one negative lens element in order to reduce the thickness thereof.

In regard to the lens arrangement of the negative second lens group 20, there is a certain amount of freedom: for example, the negative second lens group 20 can be constituted by a negative lens element, another negative lens element and a positive lens element, in this order from the object.

Specific numerical embodiments will be herein discussed. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, $F_{NO}$ designates the f-number, f designates the focal length of the entire zoom lens system, W designates the half angle-of-view (°), r designates the radius of curvature, d designates the lens-element thickness or distance between lens elements, Nd designates the refractive index of the d-line, and νd designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:
c designates a curvature of the aspherical vertex (1/r);
y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is a lens arrangement of a zoom lens system according to the first embodiment of the present invention. FIGS. 2A through 2D show aberrations occurred in the lens arrangement shown in FIG. 1 at the short focal length extremity. FIGS. 3A through 3D show aberrations occurred in the lens arrangement shown in FIG. 1 at a first intermediate focal length (on the side of the short focal length). FIGS. 4A through 4D show aberrations occurred in the lens arrangement shown in FIG. 1 at a second intermediate focal length (on the side of the long focal length). FIGS. 5A through 5D show aberrations occurred in the lens arrangement shown in FIG. 1 at the long focal length extremity. Table 1 shows the numerical data of the first embodiment.

The positive first lens group 10 (surface Nos. 1 through 3) is constituted by cemented lens elements having a negative lens element and a positive lens element, in this order from the object.

The negative second lens group 20 (surface Nos. 4 through 9) is constituted by a negative lens element, another negative lens element, and a positive lens element, in this order from the object.

The positive third lens group 30 (surface Nos. 10 through 14) is constituted by two positive lens elements and a negative lens element, in this order from the object.

The positive fourth lens group 40 (surface Nos. 15 and 16) is constituted by a positive lens element.

The filter group C (surface Nos. 17 through 20) is constituted by two parallel-plane plates.

The diaphragm S is provided 0.97 in front (on the object side) of surface No. 10 (the positive third lens group 30).

The fourth lens group 40 changes the moving direction thereof, in the U-turn path, at a focal length of 12.4 which is slightly closer to the long focal length extremity than to the focal length of "1.5×fw" (11.7).

TABLE 1

FNo. = 1:2.8–3.2–3.6–4.7
f = 7.80–11.70–18.00–39.00
W = 32.3–21.4–14.1–6.7

| Surf.No. | r | d | Nd | vd |
|---|---|---|---|---|
| 1 | 35.622 | 1.00 | 1.84666 | 23.8 |
| 2 | 23.956 | 3.22 | 1.72916 | 54.7 |
| 3 | −4022.118 | 0.40–5.47–11.09–18.70 | — | — |
| 4 | 30.222 | 0.80 | 1.88300 | 40.8 |
| 5 | 8.008 | 3.10 | — | — |
| 6 | −23.515 | 0.80 | 1.72916 | 54.7 |
| 7 | 26.755 | 0.40 | — | — |
| 8* | 13.168 | 2.29 | 1.84666 | 23.8 |
| 9 | 69.028 | 21.21–16.14–10.52–2.91 | — | — |
| 10* | 10.325 | 2.81 | 1.58913 | 61.2 |
| 11* | −29.732 | 0.10 | — | — |
| 12 | 5.751 | 2.25 | 1.49700 | 81.6 |
| 13 | 9.751 | 1.00 | 1.84666 | 23.8 |
| 14 | 4.583 | 8.58–12.25–14.05–20.91 | — | — |
| 15 | 13.656 | 2.50 | 1.69680 | 55.5 |
| 16 | 42.538 | 1.91–0.90–1.92–2.91 | — | — |
| 17 | ∞ | 1.50 | 1.51633 | 64.1 |
| 18 | ∞ | 0.50 | — | — |
| 19 | ∞ | 0.50 | 1.51633 | 64.1 |
| 20 | ∞ | 0.80 | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 8 | 0.00 | −0.56694 × 10⁻⁴ | −0.72664 × 10⁻⁶ | 0.27058 × 10⁻⁸ |
| 10 | 0.00 | 0.33587 × 10⁻⁴ | 0.43865 × 10⁻⁵ | 0.31334 × 10⁻⁶ |
| 11 | 0.00 | 0.26575 × 10⁻³ | 0.54080 × 10⁻⁵ | 0.44132 × 10⁻⁶ |

[Embodiment 2]

FIG. 6 is a lens arrangement of a zoom lens system according to the second embodiment of the present invention. FIGS. 7A through 7D show aberrations occurred in the lens arrangement shown in FIG. 6 at the short focal length extremity. FIGS. 8A through 8D show aberrations occurred in the lens arrangement shown in FIG. 6 at a first intermediate focal length (on the side of the short focal length). FIGS. 9A through 9D show aberrations occurred in the lens arrangement shown in FIG. 6 at a second intermediate focal length (on the side of the long focal length). FIGS. 10A through 10D show aberrations occurred in the lens arrangement shown in FIG. 6 at the long focal length extremity. Table 2 shows the numerical data of the second embodiment.

The basic lens arrangement of the second embodiment is the same as that of the first embodiment. The diaphragm S is provided 0.97 in front (on the object side) of surface No. 10 (the positive third lens group 30).

The fourth lens group 40 changes the moving direction thereof, in the U-turn path, at a focal length of 12.6 which is slightly closer to the long focal length extremity than to the focal length of "1.5×fw" (11.7).

TABLE 2

FNo. = 1:2.8–3.3–3.6–4.6
f = 7.80–11.70–18.00–39.00
W = 32.3–21.4–14.1–6.7

| Surf.No. | r | d | Nd | vd |
|---|---|---|---|---|
| 1 | 34.626 | 1.00 | 1.84666 | 23.8 |
| 2 | 23.564 | 3.22 | 1.72916 | 54.7 |
| 3 | 1968.636 | 0.40–5.42–11.04–18.82 | — | — |
| 4 | 28.492 | 0.80 | 1.88300 | 40.8 |
| 5 | 7.969 | 3.10 | — | — |
| 6 | −22.619 | 0.80 | 1.77250 | 49.6 |
| 7 | 26.502 | 0.40 | — | — |
| 8* | 13.471 | 2.34 | 1.84666 | 23.8 |
| 9 | 114.186 | 21.33–16.32–10.70–2.91 | — | — |
| 10* | 10.575 | 2.80 | 1.58913 | 61.2 |
| 11* | −29.216 | 0.10 | — | — |
| 12 | 5.710 | 2.26 | 1.49700 | 81.6 |
| 13 | 9.621 | 1.00 | 1.84666 | 23.8 |
| 14 | 4.572 | 8.65–12.44–14.32–20.73 | — | — |
| 15 | 13.984 | 2.50 | 1.69680 | 55.5 |
| 16 | 47.948 | 1.93–0.83–1.76–2.91 | — | — |
| 17 | ∞ | 1.50 | 1.51633 | 64.1 |
| 18 | ∞ | 0.50 | — | — |
| 19 | ∞ | 0.50 | 1.51633 | 64.1 |
| 20 | ∞ | 0.80 | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 8 | 0.00 | −0.58725 × 10⁻⁴ | −0.70038 × 10⁻⁶ | 0.23474 × 10⁻⁸ |
| 10 | 0.00 | 0.31463 × 10⁻⁴ | 0.44216 × 10⁻⁵ | 0.30287 × 10⁻⁶ |
| 11 | 0.00 | 0.25506 × 10⁻³ | 0.54812 × 10⁻⁵ | 0.41894 × 10⁻⁶ |

[Embodiment 3]

Figure 3A:
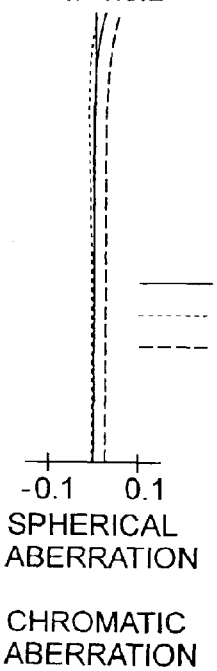
FIGS. 3A, 3B, 3C and 3D show aberrations occurred in the lens arrangement shown in FIG. 1 at a first intermediate focal length (on the side of the short focal length)
Figure 3B:
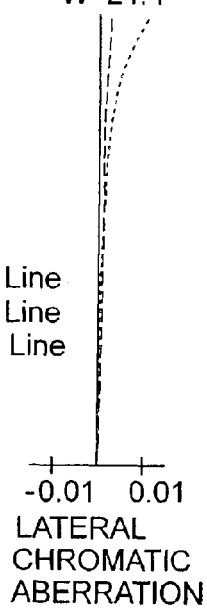
Figure 3C:
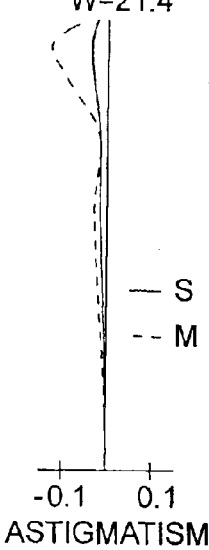
Figure 3D:
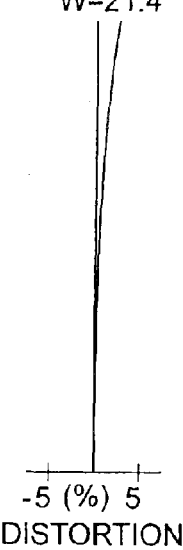
Figure 4A:
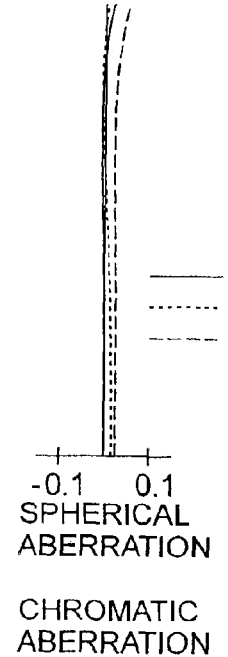
FIGS. 4A, 4B, 4C and 4D show aberrations occurred in the lens arrangement shown in FIG. 1 at a second intermediate focal length (on the side of the long focal length)
Figure 4B:
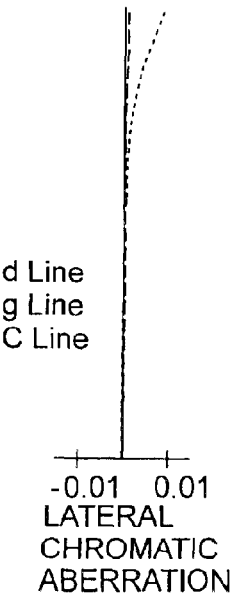
Figure 4C:
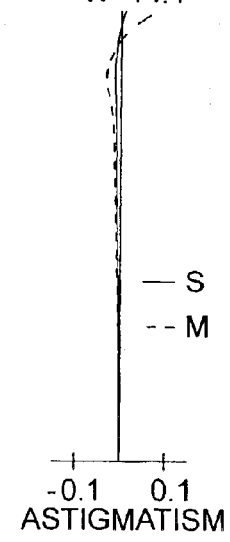
Figure 4D:
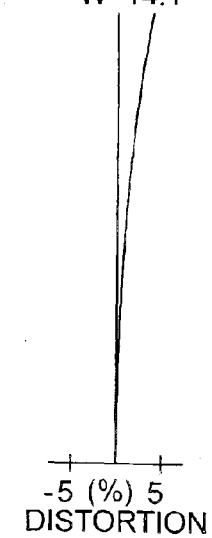
Figure 5A:
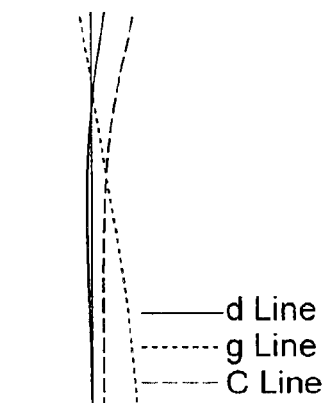
FIGS. 5A, 5B, 5C and 5D show aberrations occurred in the lens arrangement shown in FIG. 1 at the long focal length extremity.
Figure 5B:
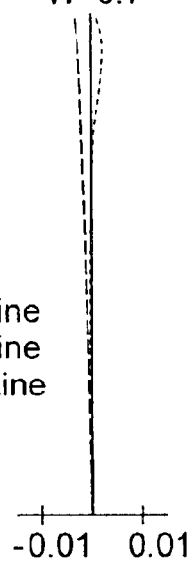
Figure 5C:
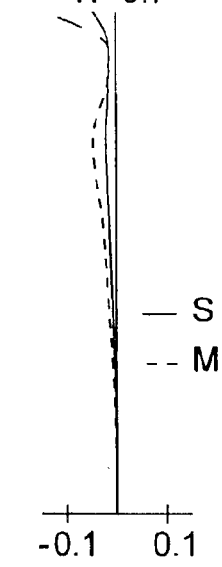
Figure 5D:
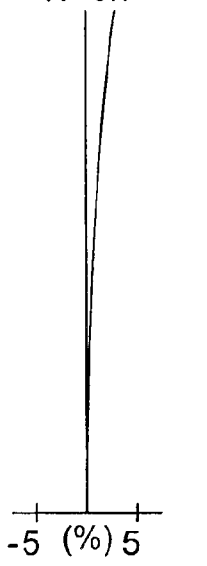
Figure 8A:
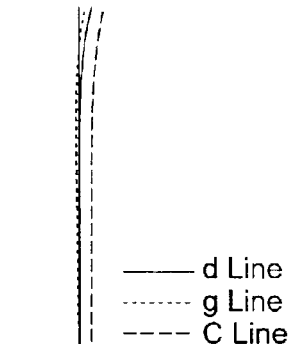
FIGS. 8A, 8B, 8C and 8D show aberrations occurred in the lens arrangement shown in FIG. 6 at a first intermediate focal length (on the side of the short focal length)
Figure 8B:
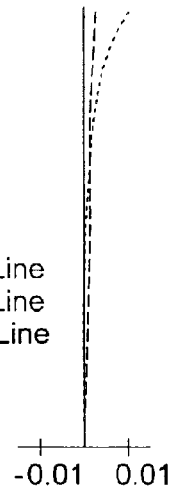
Figure 8C:
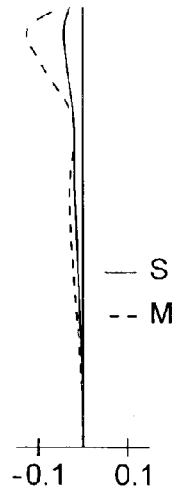
Figure 8D:
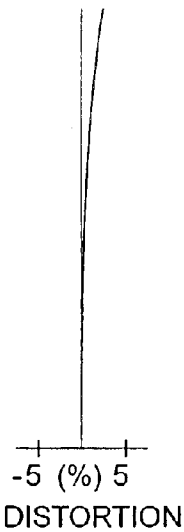
Figure 9A:
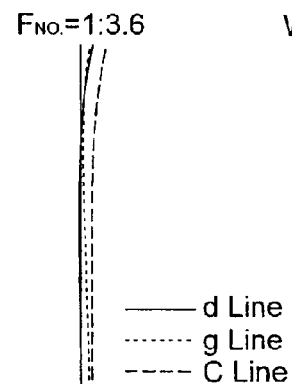
FIGS. 9A, 9B, 9C and 9D show aberrations occurred in the lens arrangement shown in FIG. 6 at a second intermediate focal length (on the side of the long focal length)
Figure 9B:
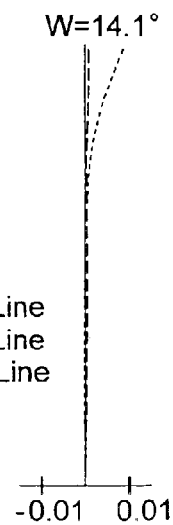
Figure 9C:
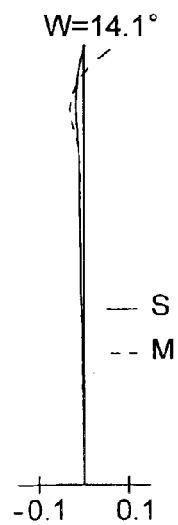
Figure 9D:
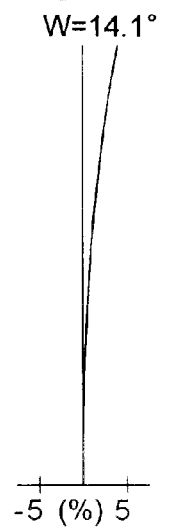
Figure 10A:
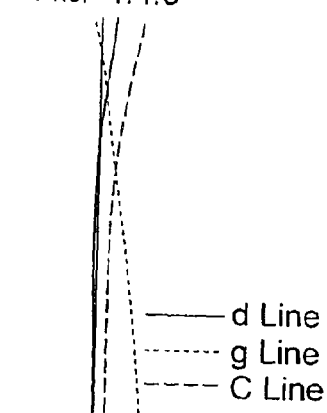
FIGS. 10A, 10B, 10C and 10D show aberrations occurred in the lens arrangement shown in FIG. 6 at the long focal length extremity.
Figure 10B:
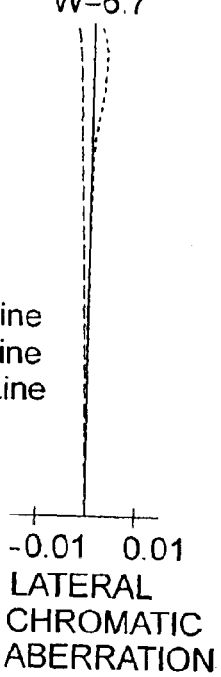
Figure 10C:
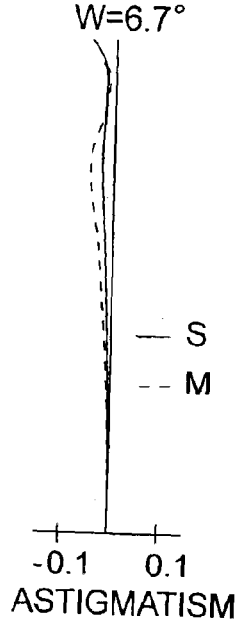
Figure 10D:
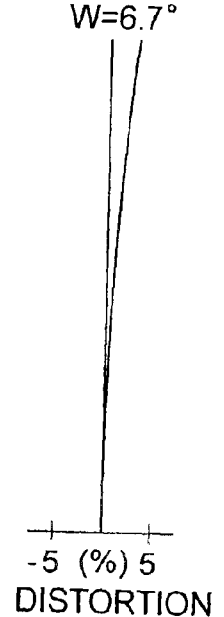
Figure 11:
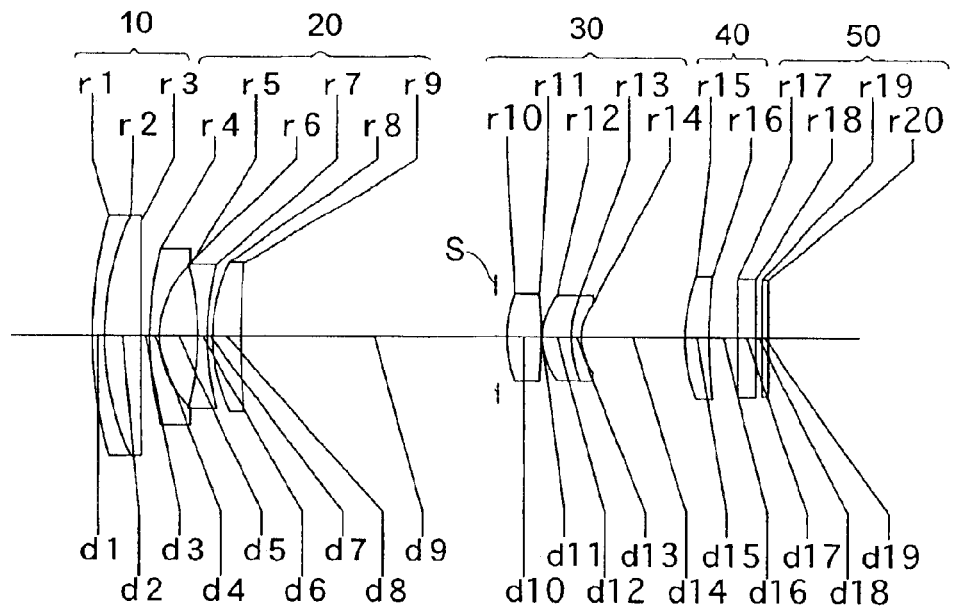
FIG. 11 is a lens arrangement of a zoom lens system according to a third embodiment of the present invention.
Figures 12A, 12B, 12C, 12D:
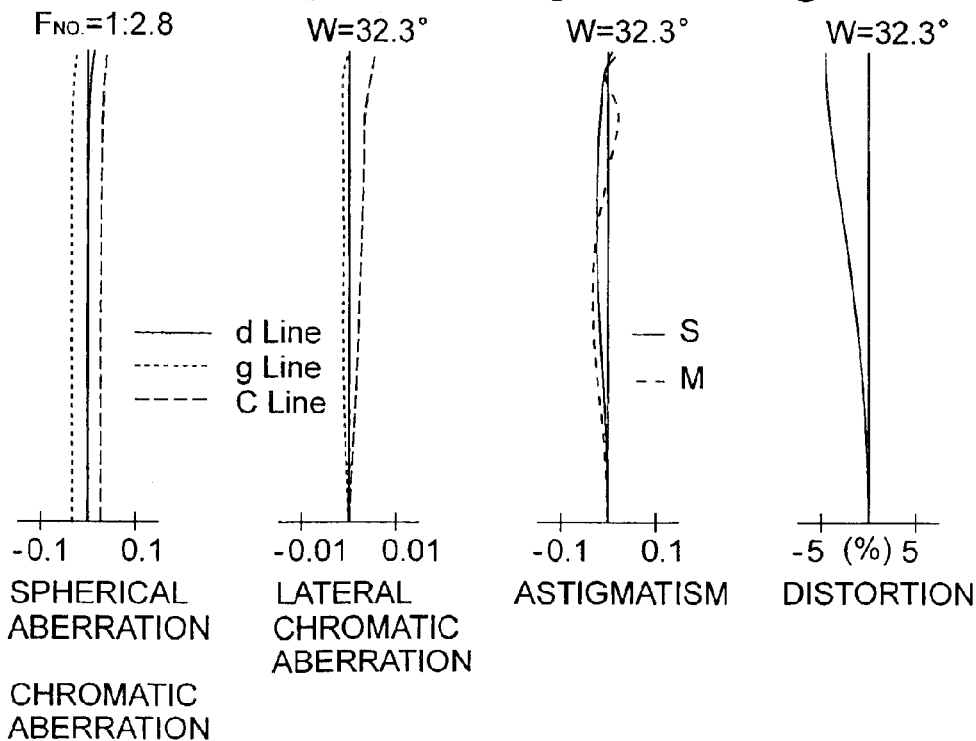
FIGS. 12A, 12B, 12C and 12D show aberrations occurred in the lens arrangement shown in FIG. 11 at the short focal length extremity.

FIG. 11 is a lens arrangement of a zoom lens system according to the third embodiment of the present invention.

FIGS. 12A through 12D show aberrations occurred in the lens arrangement shown in FIG. 11 at the short focal length extremity. FIGS. 13A through 13D show aberrations occurred in the lens arrangement shown in FIG. 11 at a first intermediate focal length (on the side of the short focal length). FIGS. 14A through 14D show aberrations occurred in the lens arrangement shown in FIG. 11 at a second intermediate focal length (on the side of the long focal length). FIGS. 15A through 15D show aberrations occurred in the lens arrangement shown in FIG. 11 at the long focal length extremity. Table 3 shows the numerical data of the third embodiment.

The basic lens arrangement of the third embodiment is the same as that of the first embodiment. The diaphragm S is provided 0.97 in front (on the object side) of surface No. 10 (the third lens group 30).

The fourth lens group 40 changes the moving direction thereof, in the U-turn path, at a focal length of 17.2 which is slightly closer to the long focal length extremity than to the focal length of "1.5×fw" (11.7).

TABLE 3

FNo. = 1:2.8–3.2–3.6–4.6
f = 7.80–11.70–18.00–40.39
W = 32.3–21.4–14.0–6.4

| Surf.No. | r | d | Nd | vd |
| --- | --- | --- | --- | --- |
| 1 | 36.033 | 1.00 | 1.84666 | 23.8 |
| 2 | 23.377 | 3.00 | 1.75500 | 52.3 |
| 3 | 1255.273 | 0.73–6.14–11.25–19.78 | — | — |
| 4 | 28.830 | 0.80 | 1.88300 | 40.8 |
| 5 | 8.179 | 3.10 | — | — |
| 6 | −24.064 | 0.80 | 1.77250 | 49.6 |
| 7 | 24.387 | 0.40 | — | — |
| 8* | 13.009 | 2.30 | 1.84666 | 23.8 |
| 9 | 84.939 | 21.96–16.55–11.44–2.91 | — | — |
| 10* | 10.785 | 2.79 | 1.58913 | 61.2 |
| 11* | 28.209 | 0.10 | — | — |
| 12 | 5.621 | 2.40 | 1.49700 | 81.6 |
| 13 | 9.050 | 0.80 | 1.84666 | 23.8 |
| 14 | 4.504 | 8.51–11.58–14.81–20.62 | — | — |
| 15 | 14.262 | 2.00 | 1.69680 | 55.5 |
| 16 | 51.252 | 2.34–1.72–1.50–2.91 | — | — |
| 17 | ∞ | 1.50 | 1.51633 | 64.1 |
| 18 | ∞ | 0.50 | — | — |
| 19 | ∞ | 0.50 | 1.51633 | 64.1 |
| 20 | ∞ | 0.80 | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
| --- | --- | --- | --- | --- |
| 8 | 0.00 | $-0.66384 \times 10^{-4}$ | $-0.66782 \times 10^{-6}$ | $0.14929 \times 10^{-8}$ |
| 10 | 0.00 | $0.73414 \times 10^{-5}$ | $0.28932 \times 10^{-5}$ | $0.26920 \times 10^{-6}$ |
| 11 | 0.00 | $0.22084 \times 10^{-3}$ | $0.37592 \times 10^{-5}$ | $0.34787 \times 10^{-6}$ |

[Embodiment 4]

FIG. 16 is a lens arrangement of a zoom lens system according to the fourth embodiment of the present invention. FIGS. 17A through 17D show aberrations occurred in the lens arrangement shown in FIG. 16 at the short focal length extremity. FIGS. 18A through 18D show aberrations occurred in the lens arrangement shown in FIG. 16 at a first intermediate focal length (on the side of the short focal length). FIGS. 19A through 19D show aberrations occurred in the lens arrangement shown in FIG. 16 at a second intermediate focal length (on the side of the long focal length). FIGS. 20A through 20D show aberrations occurred in the lens arrangement shown in FIG. 16 at the long focal length extremity. Table 4 shows the numerical data of the fourth embodiment.

The basic lens arrangement of the fourth embodiment is the same as that of the first embodiment. The diaphragm S is provided 0.97 in front (on the object side) of surface No. 10 (the third lens group 30).

The fourth lens group 40 changes the moving direction thereof, in the U-turn path, at a focal length of 15.1 which is slightly closer to the long focal length extremity than to the focal length of "1.5×fw" (12.0).

TABLE 4

FNo. = 1:2.8–3.4–3.8–4.5
f = 8.00–12.00–18.00–38.00
W = 31.8–21.2–14.2–6.9

| Surf.No. | r | d | Nd | vd |
| --- | --- | --- | --- | --- |
| 1 | 34.876 | 1.00 | 1.84666 | 23.8 |
| 2 | 24.378 | 3.24 | 1.72916 | 54.7 |
| 3 | 577.538 | 0.90–5.77–11.06–20.24 | — | — |
| 4 | 83.100 | 0.90 | 1.88300 | 40.8 |
| 5 | 8.898 | 3.41 | — | — |
| 6 | −20.543 | 0.80 | 1.72916 | 54.7 |
| 7 | 92.199 | 0.79 | — | — |
| 8 | 22.933 | 2.35 | 1.84666 | 23.8 |
| 9 | −117.115 | 22.30–17.26–12.14–2.91 | — | — |
| 10* | 9.483 | 3.17 | 1.58636 | 60.9 |
| 11* | −29.178 | 0.10 | — | — |
| 12 | 6.865 | 2.22 | 1.48749 | 70.2 |
| 13 | 13.754 | 1.49 | 1.84666 | 23.8 |
| 14 | 4.853 | 9.02–13.18–16.22–21.07 | — | — |
| 15 | 22.124 | 2.80 | 1.69680 | 55.5 |
| 16 | −48.024 | 1.91–0.60–0.47–2.91 | — | — |
| 17 | ∞ | 1.50 | 1.51633 | 64.1 |
| 18 | ∞ | 0.50 | — | — |
| 19 | ∞ | 0.50 | 1.51633 | 64.1 |
| 20 | ∞ | 0.80 | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
| --- | --- | --- | --- | --- |
| 10 | 0.00 | $-0.64631 \times 10^{-4}$ | $0.10135 \times 10^{-5}$ | $0.73294 \times 10^{-7}$ |
| 11 | 0.00 | $0.16335 \times 10^{-3}$ | $0.19595 \times 10^{-5}$ | $0.89576 \times 10^{-7}$ |

[Embodiment 5]

Figure 21:
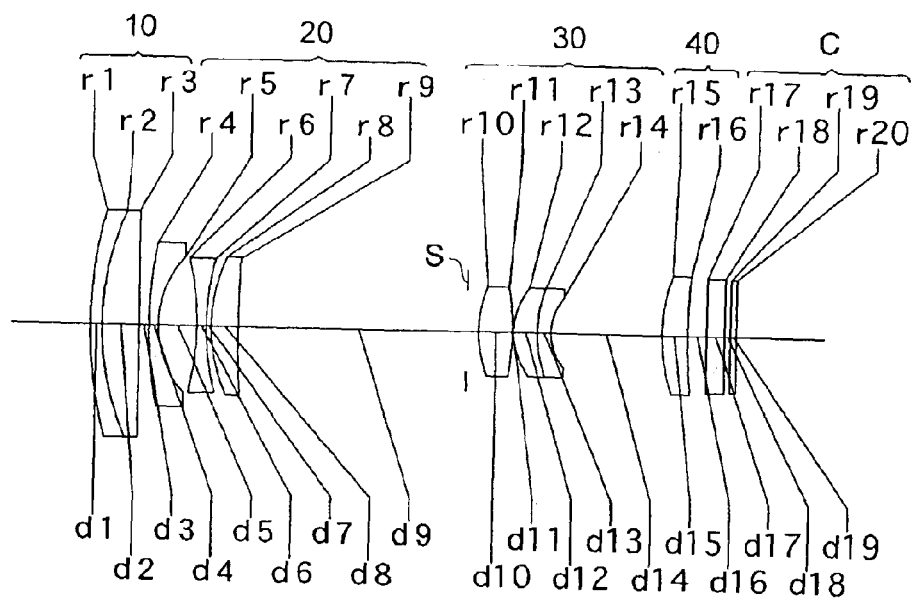
FIG. 21 is a lens arrangement of a zoom lens system according to a fifth embodiment of the present invention.
Figures 22A, 22B, 22C, 22D:
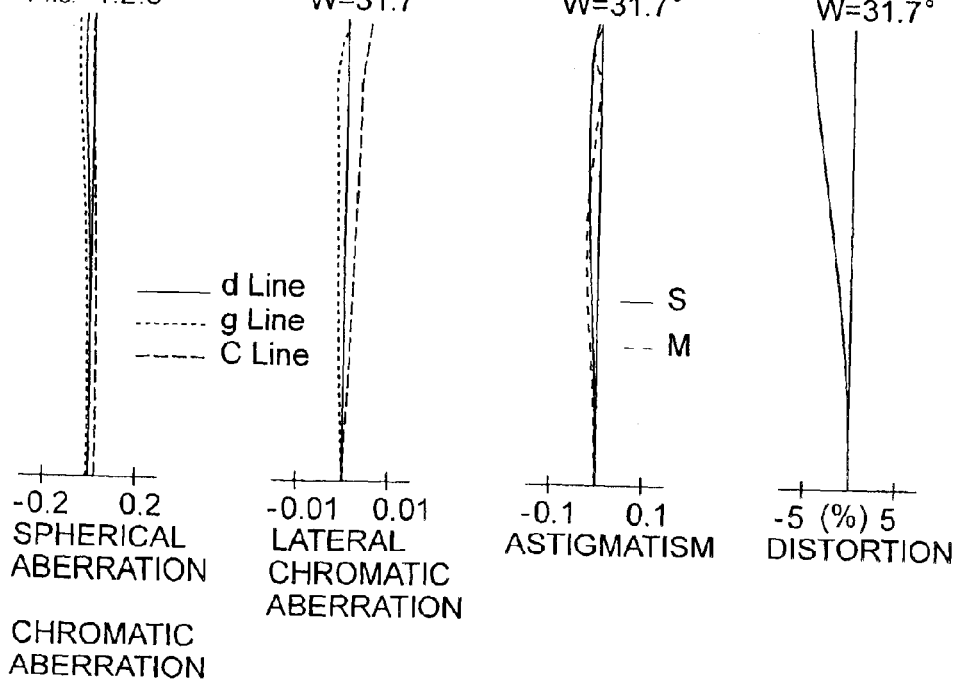
FIGS. 22A, 22B, 22C and 22D show aberrations occurred in the lens arrangement shown in FIG. 21 at the short focal length extremity.

FIG. 21 is a lens arrangement of a zoom lens system according to the fifth embodiment of the present invention. FIGS. 22A through 22D show aberrations occurred in the lens arrangement shown in FIG. 21 at the short focal length extremity. FIGS. 23A through 23D show aberrations occurred in the lens arrangement shown in FIG. 21 at a first intermediate focal length (on the side of the short focal length). FIGS. 24A through 24D show aberrations occurred in the lens arrangement shown in FIG. 21 at a second intermediate focal length (on the side of the long focal length). FIGS. 25A through 25D show aberrations occurred in the lens arrangement shown in FIG. 21 at the long focal length extremity. Table 5 shows the numerical data of the fifth embodiment.

The basic lens arrangement of the fifth embodiment is the same as that of the first embodiment. The diaphragm S is provided 0.97 in front (on the object side) of surface No. 10 (the third lens group 30).

The fourth lens group 40 changes the moving direction thereof, in the U-turn path, at a focal length of 13.6 which is slightly closer to the long focal length extremity than to the focal length of "1.5×fw" (12.0).

TABLE 5

FNo. = 1:2.8–3.2–3.6–4.5
f = 8.00–12.00–18.00–38.00
W = 31.7–20.9–14.1–6.8

| Surf.No. | r | d | Nd | vd |
|---|---|---|---|---|
| 1 | 35.447 | 1.00 | 1.84666 | 23.8 |
| 2 | 23.573 | 3.15 | 1.72916 | 54.7 |
| 3 | −1427.111 | 0.80–6.11–10.78–18.22 | — | — |
| 4 | 34.168 | 0.80 | 1.88300 | 40.8 |
| 5 | 8.472 | 3.26 | — | — |
| 6 | −22.545 | 0.80 | 1.72916 | 54.7 |
| 7 | 22.545 | 0.39 | — | — |
| 8* | 12.988 | 2.30 | 1.82114 | 0.0 |
| 9 | 93.473 | 20.29–14.98–10.31–2.87 | — | — |
| 10* | 10.080 | 2.81 | 1.58636 | 60.9 |
| 11* | −22.888 | 0.10 | — | — |
| 12 | 6.110 | 2.01 | 1.49700 | 81.6 |
| 13 | 10.452 | 1.15 | 1.84666 | 23.8 |
| 14 | 4.661 | 9.32–12.04–14.87–20.73 | — | — |
| 15 | 14.238 | 2.20 | 1.69680 | 55.5 |
| 16 | 50.018 | 1.63–1.31–1.40–2.91 | — | — |
| 17 | ∞ | 1.50 | 1.51633 | 64.1 |
| 18 | ∞ | 0.50 | — | — |
| 19 | ∞ | 0.50 | 1.51633 | 64.1 |
| 20 | ∞ | 0.80 | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $-0.75433 \times 10^{-4}$ | $-0.62067 \times 10^{-6}$ | $0.51962 \times 10^{-9}$ |
| 10 | 0.00 | $-0.11966 \times 10^{-3}$ | $0.33551 \times 10^{-6}$ | $-0.20473 \times 10^{-9}$ |
| 11 | 0.00 | $0.10574 \times 10^{-3}$ | $0.49431 \times 10^{-7}$ | $0.33000 \times 10^{-7}$ |

Table 6 shows the numerical values of each condition for each embodiment.

TABLE 6

| | Embod.1 | Embod.2 | Embod.3 | Embod.4 | Embod.5 |
|---|---|---|---|---|---|
| Cond.(1) | 0.129 | 0.141 | 0.079 | 0.164 | 0.039 |
| Cond.(2) | 0.844 | 0.840 | 0.846 | 0.834 | 0.836 |
| Cond.(3) | 2.650 | 2.614 | 2.556 | 2.528 | 2.601 |

As can be understood from Table 6, the numerical values of the first through fifth embodiments satisfy conditions (1) through (3), and as can be understood from the drawings, the various aberrations at each focal length have been adequately corrected.

According to the above description, a zoom lens system, which has (i) a small front lens diameter, (ii) a zoom ratio of 4 or more, (iii) a half angle-of-view of 30° at the short focal length extremity, and which is constituted by a small number of lens elements, can be achieved.

What is claimed is:

1. A zoom lens system comprising a positive first lens group, a negative second lens group, a positive third lens group, and a positive fourth lens group, in this order from an object, wherein upon zooming from the short focal length extremity to the long focal length extremity, all said lens group are movable in a manner that the distance between said positive first lens group and said negative second lens group increases, the distance between said negative second lens group and said positive third lens group decreases, the distance between said positive third lens group and said positive fourth lens group increases, and the distance between said positive first lens group and said positive third lens group does not change;

wherein upon zooming from the short focal length extremity to the long focal length extremity, said positive fourth lens group first moves toward an image and thereafter moves toward said object in a U-turn path; and wherein said zoom lens system satisfies the following condition:

$$0.02 < \Delta X4/fw < 0.2$$

wherein fw designates the focal length of the entire the zoom lens system at the short focal length extremity; and ΔX4 designates the traveling distance of said positive fourth lens group when the focal length fw changes to "1.5×fw" under the condition that movement of said positive fourth lens group toward the image, from a position thereof at the short focal length extremity as a reference point, is defined as a positive direction.

2. The zoom lens system according to claim 1, wherein said negative second lens group is arranged to move toward said image upon zooming from the short focal length extremity to the long focal length extremity.

3. The zoom lens system according to claim 1, wherein the zoom lens system satisfies the following conditions:

$$0.5 < |f2|/f3 < 1$$

$$2 < m3t/m3w < 4$$

wherein f2 designates the focal length of said negative second lens group;

f3 designates the focal length of said positive third lens group;

m3t designates the paraxial lateral magnification of said positive third lens group when said object at an infinite distance is in an in-focus state at the long focal length extremity; and m3w designates the paraxial lateral magnification of said third lens group when said object at an infinite distance is in an in-focus state at the short focal length extremity.

4. The zoom lens system according to claim 1, wherein said positive first lens group comprises a negative lens element and a positive lens element; and wherein said positive fourth lens group comprises a positive lens element.

5. The zoom lens system according to claim 1, wherein said positive third lens group comprises two positive lens elements and one negative lens element.

6. The zoom lens system according to claim 1, wherein focusing is performed by moving said positive fourth lens group.

* * * * *